(12) United States Patent
Steely, Jr. et al.

(10) Patent No.: US 8,281,079 B2
(45) Date of Patent: *Oct. 2, 2012

(54) MULTI-PROCESSOR SYSTEM RECEIVING INPUT FROM A PRE-FETCH BUFFER

(75) Inventors: Simon C. Steely, Jr., Hudson, NH (US); Gregory Edward Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2325 days.

This patent is subject to a terminal disclaimer.

(21) Appl. No.: 10/756,535

(22) Filed: Jan. 13, 2004

(65) Prior Publication Data

US 2005/0154836 A1 Jul. 14, 2005

(51) Int. Cl.
*G06F 13/42* (2006.01)
(52) U.S. Cl. ......... 711/144; 711/119; 711/124; 711/141
(58) Field of Classification Search ................ 711/119, 711/124, 141, 144
See application file for complete search history.

(56) References Cited

U.S. PATENT DOCUMENTS

| | | | |
|---|---|---|---|
| 5,197,132 A | 3/1993 | Steely, Jr. et al. | |
| 5,222,224 A | 6/1993 | Flynn et al. | |
| 5,404,483 A | 4/1995 | Stamm et al. | |
| 5,420,991 A * | 5/1995 | Konigsfeld et al. | 711/150 |
| 5,491,811 A * | 2/1996 | Arimilli et al. | 711/144 |
| 5,519,841 A | 5/1996 | Sager et al. | |
| 5,625,829 A | 4/1997 | Gephardt et al. | |
| 5,651,125 A * | 7/1997 | Witt et al. | 712/218 |
| 5,721,855 A | 2/1998 | Hinton et al. | |
| 5,802,577 A | 9/1998 | Bhat et al. | |
| 5,829,040 A | 10/1998 | Son | |
| 5,845,101 A | 12/1998 | Johnson et al. | |
| 5,875,467 A | 2/1999 | Merchant | |
| 5,875,472 A | 2/1999 | Bauman et al. | |
| 5,958,019 A | 9/1999 | Hagersten et al. | |
| 6,032,231 A | 2/2000 | Gujral | |
| 6,055,605 A | 4/2000 | Sharma et al. | |
| 6,081,887 A | 6/2000 | Steely, Jr. et al. | |
| 6,085,263 A | 7/2000 | Sharma et al. | |
| 6,108,737 A | 8/2000 | Sharma et al. | |
| 6,134,646 A | 10/2000 | Feiste et al. | |
| 6,151,671 A | 11/2000 | D'Sa et al. | |
| 6,209,065 B1 | 3/2001 | Van Doren et al. | |
| 6,275,905 B1 * | 8/2001 | Keller et al. | 711/141 |
| 6,286,090 B1 | 9/2001 | Steely, Jr. et al. | |
| 6,301,654 B1 | 10/2001 | Ronchetti et al. | |
| 6,317,811 B1 | 11/2001 | Deshpande et al. | |
| 6,345,342 B1 | 2/2002 | Arimilli et al. | |
| 6,349,382 B1 | 2/2002 | Feiste et al. | |
| 6,356,918 B1 | 3/2002 | Chuang et al. | |
| 6,408,363 B1 | 6/2002 | Lesartre et al. | |

(Continued)

OTHER PUBLICATIONS

M. Lipasti, C. Wilkerson, and J. Shen. Value locality and load value prediction. In Proceedings of the 7th ASPLOS, Boston, MA, Oct. 1996.*

(Continued)

*Primary Examiner* — Yaima Campos
*Assistant Examiner* — Samuel Dillon

(57) ABSTRACT

Multi-processor systems and methods are disclosed that employ a pre-fetch buffer to provide data fills to a source processor in response to a request. A pre-fetch buffer retrieves data as a uncached data fill. The source processor processes the data in response to a source request.

5 Claims, 5 Drawing Sheets

U.S. PATENT DOCUMENTS

| | | |
|---|---|---|
| 6,412,067 B1 | 6/2002 | Ramirez et al. |
| 6,457,101 B1 | 9/2002 | Bauman et al. |
| 6,493,802 B1 * | 12/2002 | Kessler et al. ................ 711/144 |
| 6,535,941 B1 | 3/2003 | Kruse |
| 6,553,480 B1 | 4/2003 | Cheong et al. |
| 6,574,712 B1 | 6/2003 | Kahle et al. |
| 6,591,348 B1 | 7/2003 | Deshpande et al. |
| 6,594,821 B1 | 7/2003 | Banning et al. |
| 6,615,343 B1 | 9/2003 | Talcott et al. |
| 6,633,960 B1 | 10/2003 | Kessler et al. |
| 6,633,970 B1 * | 10/2003 | Clift et al. .................... 712/217 |
| 6,651,143 B2 | 11/2003 | Mounes-Toussi |
| 6,775,749 B1 * | 8/2004 | Mudgett et al. ............... 711/146 |
| 7,234,029 B2 * | 6/2007 | Khare et al. .................. 711/146 |
| 2001/0055277 A1 | 12/2001 | Steely, Jr. et al. |
| 2002/0009095 A1 | 1/2002 | Van Doren et al. |
| 2002/0099833 A1 | 7/2002 | Steely, Jr. et al. |
| 2002/0099913 A1 | 7/2002 | Steely, Jr. |
| 2002/0146022 A1 | 10/2002 | Van Doren et al. |
| 2002/0194290 A1 | 12/2002 | Steely, Jr. et al. |
| 2002/0194436 A1 | 12/2002 | McKenney |
| 2002/0199067 A1 * | 12/2002 | Patel et al. .................... 711/145 |
| 2003/0069902 A1 | 4/2003 | Narang et al. |
| 2003/0145136 A1 | 7/2003 | Tierney et al. |
| 2003/0195939 A1 | 10/2003 | Edirisooriya et al. |

OTHER PUBLICATIONS

J. Handy, The Cache Memory Book. New York: Academic, 1993.*

Vijaykumar et al. Speculative Versioning Cache. IEEE Transactions on parallel and distributed systems. vol. 12. No. 12. Dec. 2001.*

T. Sato, K. Ohno, and H. Nakashima. "A Mechanism for Speculative Memory Accesses Following Synchronizing Operations," in Proc. of Intl. Parallel and Distributed Processing Symp. IPDPS00. May 2000.*

M. Cintra, J. F. Martnez, and J. Torrellas. Architectural support for scalable speculative parallelization in shared-memory multiprocessors. In Proceedings of the 27th Annual International Symposium on Computer Architecture. Jun. 2000.*

Rajiv Gupta. The fuzzy barrier: A mechanism for high speed synchronization of processors. In Proceedings of the Third International Conference on Architectural Support for Programming Languages and Operating Systems (ASPLOS III). 1989. ACM Press.*

Gharachorloo, et al., "Memory Consistency and Event Ordering in Scalable Shared-Memory Multiprocessors", Computer Systems Laboratory, Stanford University, CA 94305, pp. 1-14.

Gharachorloo, et al., "Architecture and Design of AlphaServer GS320", pp. 1-16.

* cited by examiner

MULTI-PROCESSOR SYSTEM RECEIVING INPUT FROM A PRE-FETCH BUFFER

CROSS REFERENCE TO RELATED APPLICATIONS

This application is related to the following commonly assigned co-pending patent applications entitled: "COHERENT SIGNAL IN A MULTI-PROCESSOR SYSTEM," application Ser. No. 10/756,636; "MULTI-PROCESSOR SYSTEMS AND METHODS FOR BACKUP FOR NON-COHERENT SPECULATIVE FILLS," application Ser. No. 10/756,637; "CACHE SYSTEMS AND METHODS FOR EMPLOYING SPECULATIVE FILLS," application Ser. No. 10/756,638; "REGISTER FILES SYSTEMS AND METHODS FOR EMPLOYING SPECULATIVE FILLS," application Ser. No. 10/756,644; "SYSTEMS AND METHODS FOR EXECUTING ACROSS AT LEAST ONE MEMORY BARRIER EMPLOYING SPECULATIVE FILLS," application Ser. No. 10/756,639; "MULTI-PROCESSOR SYSTEM UTILIZING SPECULATIVE SOURCE REQUESTS," application Ser. No. 10/756,640; "SOURCE REQUEST ARBITRATION," application Ser. No. 10/755,919; "SYSTEMS AND METHODS FOR EMPLOYING SPECULATIVE FILLS," application Ser. No. 10/755,938; "CONSISTENCY EVALUATION OF PROGRAM EXECUTION ACROSS AT LEAST ONE MEMORY BARRIER," application Ser. No. 10/756,534 all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Another technique for reducing processor latency times is pre-fetching. Pre-fetching is the providing of data, such as processor instructions, from a first memory location (e.g., main memory) to a second, more accessible memory location (e.g., a dedicated pre-fetch buffer) before the information is required by the processor. The pre-fetch buffer "anticipates" the data that will be required by the processor, retrieving data according to a pre-fetching algorithm. Proper selection of the pre-fetched data can significantly reduce the access time of the processor for the required data.

Coherency protocols have been developed to ensure that whenever a processor reads or writes to a memory location it receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

SUMMARY

One embodiment of the present invention may comprise a system that employs a pre-fetch buffer to provide uncached data fills to a source processor in response to a request. A pre-fetch buffer retrieves data as a uncached data fill. The source processor processes the data in response to a source request.

Another embodiment of the present invention may comprise a multiprocessor system having a pre-fetch buffer that stores uncached data fills associated with a pre-fetch request. A source processor receives an uncached data fill from the pre-fetch buffer in response to a source request and executes with the uncached data fill. The system employs a cache coherency protocol that returns a coherent copy of the data fill and a coherent signal in response to the source request.

Yet another embodiment of the present invention may comprise a multiprocessor system comprising means for executing program instructions associated with a source processor. The system may further comprise means for retrieving a data fill, having an associated state, from at least one other processor without changing the associated state of the data fill. The system may further comprise means for storing the retrieved data fill at a buffer to be provided to the means for executing and means for providing a coherent signal that indicates if the retrieved data fill is coherent at the time it is provided to the means for executing.

Still another embodiment of the invention may comprise a method for utilizing data at a pre-fetch buffer. A copy of a data fill is stored in a pre-fetch buffer. The copied data fill is provided to a processor associated with the pre-fetch buffer in response to the source request. It is then determined If the copied data fill is coherent at the time when the copied data fill is provided to the processor.

DETAILED DESCRIPTION

This disclosure relates generally to multi-processor communication systems and methods. The systems and methods employ one or more pre-fetch buffers, each of which can be operative to acquire a desired data fill prior to a source request from an associated processor. A data fill refers to a copy of a memory block associated with a given cache line. A given pre-fetch buffer can acquire a data fill without filtering the state of other processing units and nodes within the system, such that the processing unit presently in possession of the data, the "owner" node, can continue to read and modify the data. This is referred to as an uncached fill. When the pre-fetch buffer acquires the data, the acquired data can be a coherent copy or a non-coherent copy of the desired data. A coherent copy of data is a copy that is determined to be the latest or most up to date version. When the processor retrieves the data from the pre-fetch buffer, the copy acquired by the pre-fetch buffer may no longer be a coherent copy due to subsequent changes to the data by the owner node.

In response to a source request, the pre-fetch buffer provides the data to the processor as a speculative fill. A speculative fill is a data fill that is not known to be coherent. The processor generates a source request to obtain a coherent copy of the data fill from the system. The system provides a coherent signal to the processor, indicating whether the pre-fetched speculative fill is coherent. Once the coherent signal is returned, the source can continue execution if the speculative fill is the same as the coherent fill or backup and re-execute instructions with a coherent copy if the speculative fill is different from the coherent fill. The systems and methods can be employed in multi-processor system utilizing a cache coherency protocol. The coherent signal can be part of or work in cooperation with the cache coherency protocol.

Figure 1:
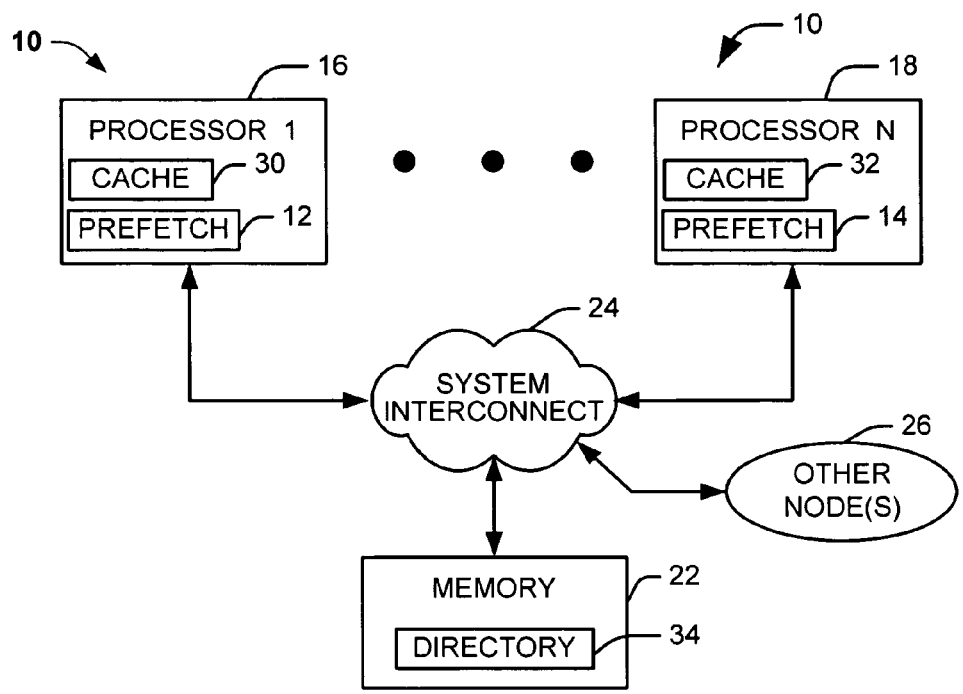
FIG. 1 depicts an example of a multiprocessor system.

FIG. 1 depicts an example of a system 10 that can utilize one or more pre-fetch buffers 12 and 14 in combination with a coherent signal to unobtrusively pre-fetch data for one or more associated processors 16 and 18 (indicated as PROCESSOR 1 through PROCESSOR N, where N is a positive integer (N>1)). A given pre-fetch buffer (e.g., 12) determines one or more blocks of data that are likely to be needed by its associated processor (e.g., 16) based upon the current activity of the processor (e.g., current program instruction execution). For example, where a processor 16 has failed to find a desired data block in its cache, its associated pre-fetch buffer 12 can obtain one or more additional blocks of data related to the desired data block (e.g., spatially proximate in memory, subsequent in a known pattern of access, etc.) from a system memory 22. It will be appreciated that the blocks of data can represent executable program instructions for the processors. A variety of pre-fetch algorithms of varying complexity can be utilized to select the related data in accordance with the present invention. The memory 22 can be implemented as a globally accessible aggregate memory. For example, the memory 22 can include a one or more memory storage devices (e.g., dynamic random access memory (DRAM)).

The processors 16 and 18 and memory 22 define nodes in the system that can communicate with each other via requests and corresponding responses through a system interconnect 24. For example, the system interconnect 24 can be implemented as a switch fabric or a hierarchical switch. Also associated with the system 10 can be one or more other nodes, indicated schematically at 26. The other nodes 26 can correspond to one or more other multi-processor systems connected to the system interconnect 24, such as through an appropriate interconnect interface (not shown.)

Each of the processors 16 and 18 includes at least one corresponding cache 30 and 32. For purposes of brevity, each of the respective caches 30 and 32 are depicted as unitary memory devices, although they may include a plurality of memory devices or different cache levels. Each of the caches 30 and 32 contains a plurality of cache lines. Each cache line has an associated address that identifies corresponding data stored in the line. The cache lines can also include information identifying the state of the data for the respective lines.

The system thus employs the caches 30 and 32 and the memory 22 to store books of data, referred to herein as "memory blocks" or "data fills". A memory block or data fill can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 22.

The system 10 implements a cache coherency protocol to manage the sharing of memory blocks so as to guarantee coherence of data. The cache coherency protocol of the system 10 utilizes a plurality of states to identify the state of each memory block stored in a respective cache line and the memory 22. The coherency protocol establishes rules for transitioning between states, such as if data is read from or written to memory 22 or one of the caches 30 and 32.

As used herein, a node that issues a request, such as a read or write request, defines a source node. Other nodes within the system 10 are potential targets of the request. Additionally, each memory block in the system 10 can be assigned a "home node" that maintains necessary global information and a data value for that memory block. The home node can be defined as a processor (or central processing unit), associated cache and associated memory/directory.

For example, when a source node, such as a processor 16, requires a copy of a given memory block, it typically first requests the memory block from its local, private cache (e.g., 30) by identifying the address associated with the memory block. If the data is not in the cache, the processor can search its local pre-fetch buffer (e.g., 12) for a copy of the data. If the data is found locally, the memory access is resolved without communication via the system interconnect 24. Where the requested memory block is not found locally, the source node 16 can request the memory block from the system 10, including the memory 22. In addition to the request identifying an address associated with the requested memory block, the request usually identifies the type of request or command being issued by the requester.

By way of example, assume that the processor 16 (a source node) requires a copy of data associated with a particular address, and assume that the data is unavailable from its own local cache 30 and pre-fetch buffer 12. Since the processor 16 is unable to access the data in its local cache 30, the processor 16, as the source node, transmits a source request to other nodes and memory 22 via the system interconnect 24. For example, the request can correspond to a source read request for a memory block associated with the address identified in the request. The request also can identify what type of request is being issued by source node 16. In the illustrated example, a pre-fetch request for data from a related address accompanies the source request.

In a directory based cache coherency protocol, the pre-fetch request is transmitted from the source processor 16 to a home node in the system 10. The home node retains location information (e.g., in a directory) of the owner of the requested cache lines representing the requested data. The home node provides a forward signal to the owner. The owner then responds with a coherent copy of the requested data, which is received by the requester and stored in the pre-fetch buffer 12. The pre-fetch request does not result in a change in the state of the requested data. For example, the pre-fetch request can return a copy of the data to the pre-fetch buffer while allowing the desired cache lines to retain their existing state with regard to the plurality of processors. This copy, taken outside of the normal coherency protocols, is referred to as an uncached fill.

If the data provided to the pre-fetch buffer 12 is not required by the processor 16, it is eventually overwritten by new data. If the data is required, however, it may be accessed some time after it was originally obtained. The data could be changed by the owner node during the intervening interval, such that the copy of the data stored in the pre-fetch buffer is no longer a coherent copy. Accordingly, the possibly outdated data can be provided to the processor as a speculative fill. A speculative fill is a data fill that may or may not be the latest version of the memory block. The use of a speculative fill allows the requesting processor to execute several thousands of program instructions ahead prior to receiving a coherent copy of the requested memory block.

The source processor 16 reads the speculative data fill from the pre-fetch buffer and begins executing the provided instructions. While the instructions are being processed, the processor 16 sends a source request for a coherent copy of the provided data to the home node. This request can change the associated state of the data in accordance with the cache coherency protocol of the system 10. The home node provides a forward signal to the owner. The owner then provides a coherent copy of the requested data to the home node, which compares it with the speculative data fill provided by the pre-fetch buffer 12.

If the speculative fill from the pre-fetch buffer matches the coherent copy, a coherent signal is provided to the source processor 16 indicating that the speculative data fill from the pre-fetch buffer 12 is a coherent copy of the data. The processor 16 continues execution uninterrupted, mitigating the latency that would have resulted had the processor remained in an idle state until the coherent copy was received. If the coherent copy does not match the pre-fetched speculative fill (e.g., the data had been altered during the intervening interval), the coherent fill is provided to the processor 16 along with a coherent signal indicating that the coherent fill is a coherent copy of the data. The processor 16 then backs up and begins executing again with the new data, but loses little or no time from the execution of the speculative fill as the processor 16 would have remained latent during the retrieval of the coherent copy regardless. The cache coherency protocol can continue executing after the coherent copy is retrieved to change states of one or more copies of the memory block in the system based on the request (e.g., read, write) of the processor 16.

Figure 2:
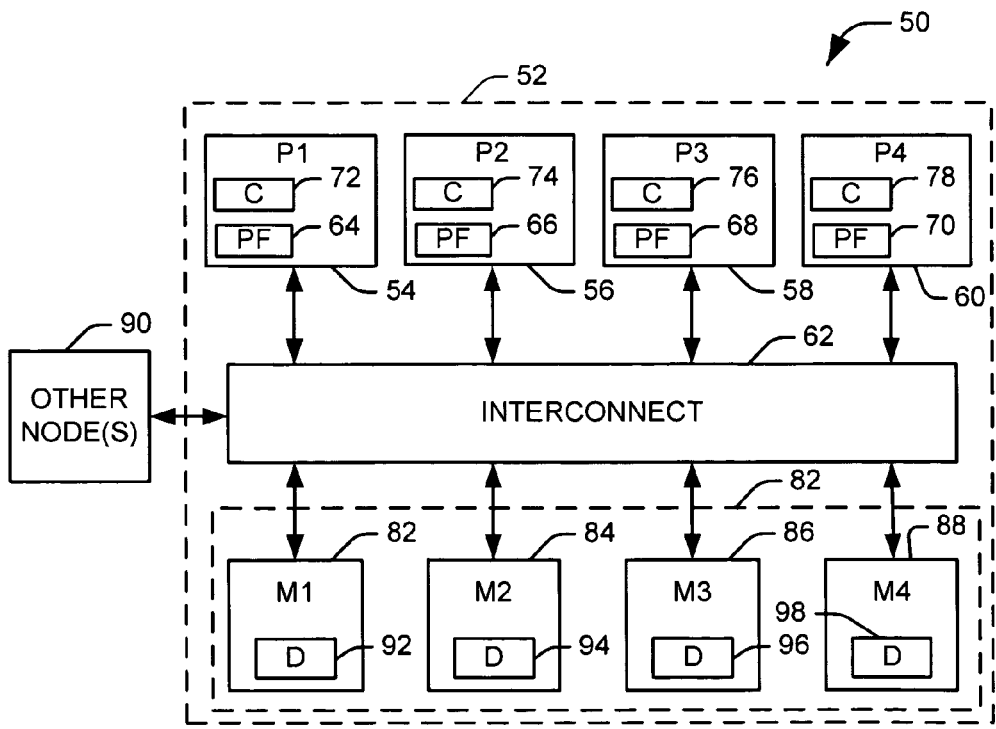
FIG. 2 depicts an example of another multiprocessor system.

FIG. 2 depicts an example of a multiprocessor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54, 56, 58 and 60 are depicted in the example of FIG. 2, those skilled in the art will appreciate that a greater or smaller number of processors can be implemented in the node 52.

Each processor 54, 56, 58 and 60 includes a pre-fetch buffer 64, 66, 68, and 70 that obtains data that may be required by its respective processor within a predetermined interval. Generally, pre-fetch requests are sent out about the same time as fill requests by a processor (e.g., 54). Appropriate data for each of the pre-fetch buffers 64, 66, 68, and 70 is determined according to respective pre-fetch algorithms that identify data related to that requested by the processor in the fill request. For example, the pre-fetch algorithm can select data that is spatially proximate to the desired data in memory or subsequent to the desired data in a known pattern (e.g., every tenth block or every hundredth block can be selected).

Each processor 54, 56, 58, and 60 also includes an associated cache 72, 74, 76 and 78. The caches 72, 74, 76 and 78 can enable faster access to data than is available from an associated main memory 80 of the node 52. The system 50 implements a cache coherency protocol designed to guarantee coherency of data in the system. By way of example, the cache coherency protocol can be implemented to include a source protocol in which requests for data are transmitted to a home node, which retains owner information in a directory associated with a given cache line.

The memory 80 can include multiple memory modules (M1, M2, M3, M4) 82, 84, 86 and 88. For example, the memory 80 can be organized as a single address space that is shared by the processors 54, 56, 58, and 60 as well as other nodes 90 of the system 50. Alternatively, each memory module 82, 84, 86 and 88 can be associated with a respective one of the processors 54, 56, 58, and 60. Each of the memory modules 82, 84, 86 and 88 can include a corresponding directory 92, 94, 96 and 98 that defines how the memory blocks are apportioned in each respective module as well as where the corresponding coherent copy of data should reside in the system 50. The coherent copy of data, for example, may reside in the home memory module or, alternatively, in a cache of one of the processors 54, 56, 58, and 60.

The other node(s) 90 can include one or more other SMP nodes associated with the SMP node 52 via the interconnect 62. For example, the interconnect 62 can be implemented as a switch fabric or hierarchical switch programmed and/or configured to manage transferring requests and responses between the processors 54, 56, 58, and 60 and the memory 80, as well as those to and from the other nodes 90.

When data desired by a processor (e.g., 56) is not available from its associated cache, the processor 56 can receive speculative copies or fills of the desired data from its associated pre-fetch buffer. The source processor can employ the speculative copy to execute several thousands of instructions ahead prior to receiving a coherent version of the data. The processor 56 then issues a source request (e.g., a read request or write request) to the system 50. A home node responds to the request by providing a forwarding signal to an owner processor. The owner processor returns a coherent copy of the data fill. The system 50 also returns a coherent signal that indicates that the copy returned from the owner processor is the coherent version of the requested data. If the coherent data fill is different from the pre-fetched speculative fill, the processor can back up and re-execute program instructions with the new data. If the coherent data fill is the same as the speculative fill, the processor can continue execution of new program instructions.

Figure 3:
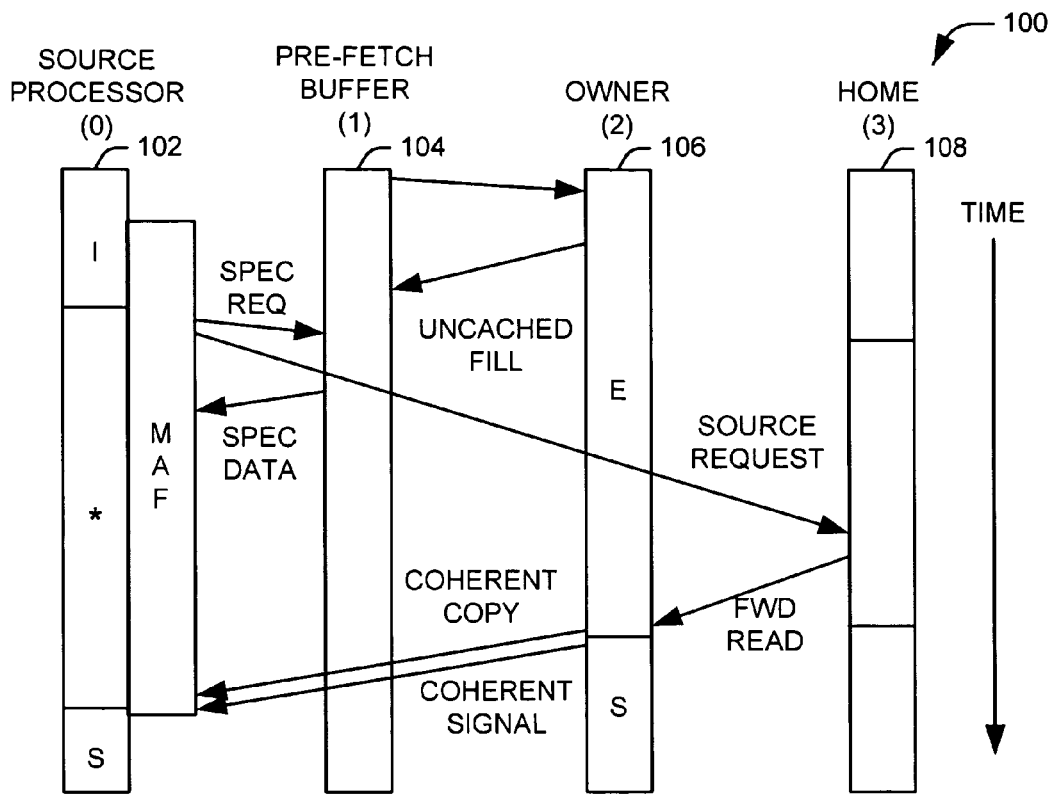
FIG. 3 illustrates a state diagram associated with a source read request.

FIG. 3 illustrates a network 100 having a source processor 102, a pre-fetch buffer 104, a owner node 106, and a home node 108. FIG. 3 illustrates various interrelationships between requests and responses and state transitions that can occur for a given memory address in different memory devices or caches. In the illustrated example, time flows in the direction of an arrow labeled "TIME". The illustrated relationships focus on the acquisition of a cache line from the owner node 106 by the source processor 102 via a source read request. The cache line can assume a number of states with respect to the source processor 102, the owner node 106 and other nodes and processors in the multi-processor system. These states are summarized in the following table:

TABLE 1

| STATE | DESCRIPTION |
|---|---|
| I | Invalid - The cache line is not present in the processor cache. |
| S | Shared - The cache line is valid and unmodified by caching processor. Other processors may have valid copies. |
| E | Exclusive - The cache line is valid and unmodified by caching processor. The caching processor has the only cached copy in the system. |
| M | Modified - The cache line is valid and has been modified by the caching processor. The caching processor has the only cached copy in the system. |

In the illustrated example, the cache line is initially exclusive to the owner node, such that the owner node is in an exclusive state and the source node is in an invalid state.

During a cache miss or other trigger incident, the pre-fetch buffer 104 can generate a pre-fetch request that requests an uncached fill of the cache line from the owner node. An uncached fill is the retrieval of a copy of a particular item of data outside of the cache coherency protocol of the system, such that data is retrieved without changing the state associated with the data. The pre-fetch buffer 104 can contain a plurality of pre-fetched cache lines for use by an associated source processor 102. The cache lines stored can be selected according to a pre-fetch algorithm associated with the pre-fetch buffer 104. The owner node 106 returns the requested uncached fill, but the cache line remains in an exclusive state.

The source processor provides a speculative fill request to the pre-fetch buffer 104 in response to a cache miss on the cache line. The pre-fetch buffer provides the buffered copy of the cache line to the processor 102 as a speculative fill. The pre-fetched copy is a speculative fill because it is unknown at the time the copy is sent to the requesting processor 102 if the pre-fetched copy is coherent. The source processor 102 executes the provided speculative fill, but also generates a source read request to a home node 108 to request a coherent copy of the cache line. The home node or processor 108 determines the owner 106 of the cache line requested from a home directory, and forwards the request to the owner 106. The owner 106 replies by providing a coherent fill of the requested cache line to the source processor 102. The cache line then assumes a shared state as the owner node 106 no longer has an exclusive copy of the cache line.

A coherent signal accompanies the coherent fill of the cache line provided to the source processor 102. The coherent signal is an indicator that provides an indication to the source that the copy provided by the owner is the coherent version of the cache line. In the example of FIG. 3, the coherent signal is provided by the owner. However, the coherent signal can be provided by control logic associated with the multi-processor system, by the home node or processor 108 or by some other structure in the multi-processor system. The coherent signal can be a structure such as a data packet, or a tag associated with each data fill that is marked to indicate which of the data fills are coherent, or a tag associated with only the coherent version of the cache line. The coherent signal can be a mask or vector that indicated which portions (e.g., data fields, data quantums, data blocks) of a data fill are coherent. Additionally, the coherent signal can be a mask or vector that indicates which of a plurality of responses to a plurality of requests have returned coherent copies. The coherent signal can be sent prior to, after or concurrently with the coherent version of the cache line.

Once the source processor 102 receives the coherent signal, the source processor has a verified copy of the cache line shared with at least the owner node. A comparison of the coherent fill and the speculative fill provided by the pre-fetch buffer 104 is performed to determine the coherency of the speculative fill. If the coherent data fill is different from the speculative fill, the source processor 102 can back up to its state prior to the speculative fill and start executing again with the coherent data. If the coherent data fill is the same as the speculative fill, the source processor can continue execution.

Figure 4:
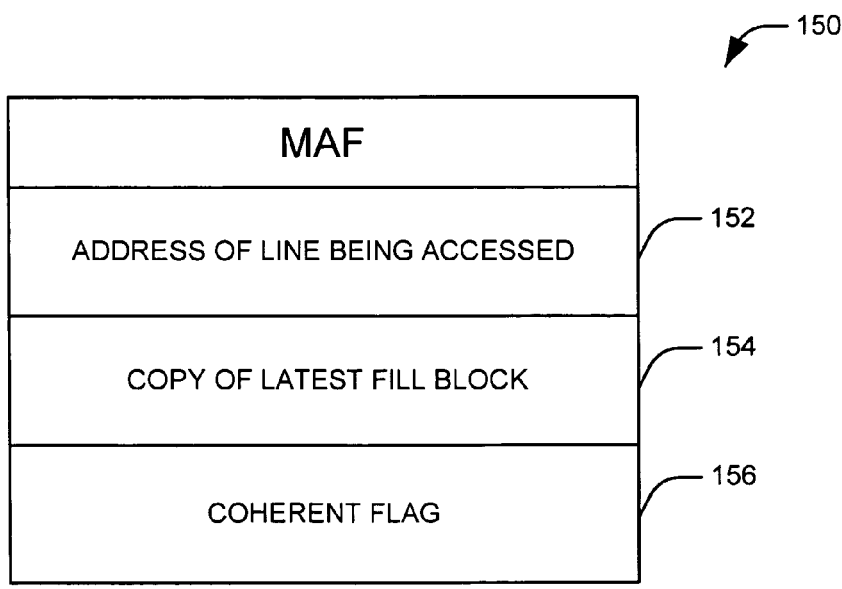
FIG. 4 illustrates a block diagram of a miss address file (MAF).

FIG. 4 illustrates a block diagram of a miss address file (MAF) entry 150 that can be employed to track data fills received in response to a source request. A MAF entry is generated by a source each time a source processor generates a source request. The MAF entry 150 contains fields associated with outstanding source requests corresponding to respective cache lines. The MAF fields can include the cache line address being requested 152, the copy of the latest fill block 154 returned by the system and a flag 156 that provides an indication of whether or not the coherent signal has been received. Other entries or fields can be employed to maintain information associated with a given cache line broadcast request.

During operation, the field for the latest fill block 154 is filled by a speculative fill from the pre-fetch buffer, if the desired data is available in the pre-fetch buffer. Otherwise, the entry is filled by a first response from a system source request. A system source request can produce multiple responses, including a coherent fill of the data and one or more speculative fills from other processor caches. Each time a new fill is received, the source determines if new fill is the same as the data fill in the MAF entry 150. If the new fill is different, the source replaces the previous data fill with the new fill. If the new data fill is different from the speculative fill used by the source processor to continue execution, the processor may backup and re-execute program instructions. This may be the case if it is determined that a subsequent fill is more likely coherent than the original fill employed by the processor to continue execution.

The source also checks to see if the state of the coherent flag 156 has changed indicating that the coherent signal has been received. Once the coherent flag 156 changes state, the source can compare the coherent fill 154 stored in the MAF entry 150 with the speculative fill used to continue execution of the processor to determine if execution should continue or whether the processor needs to re-execute the program instructions.

Figure 5:
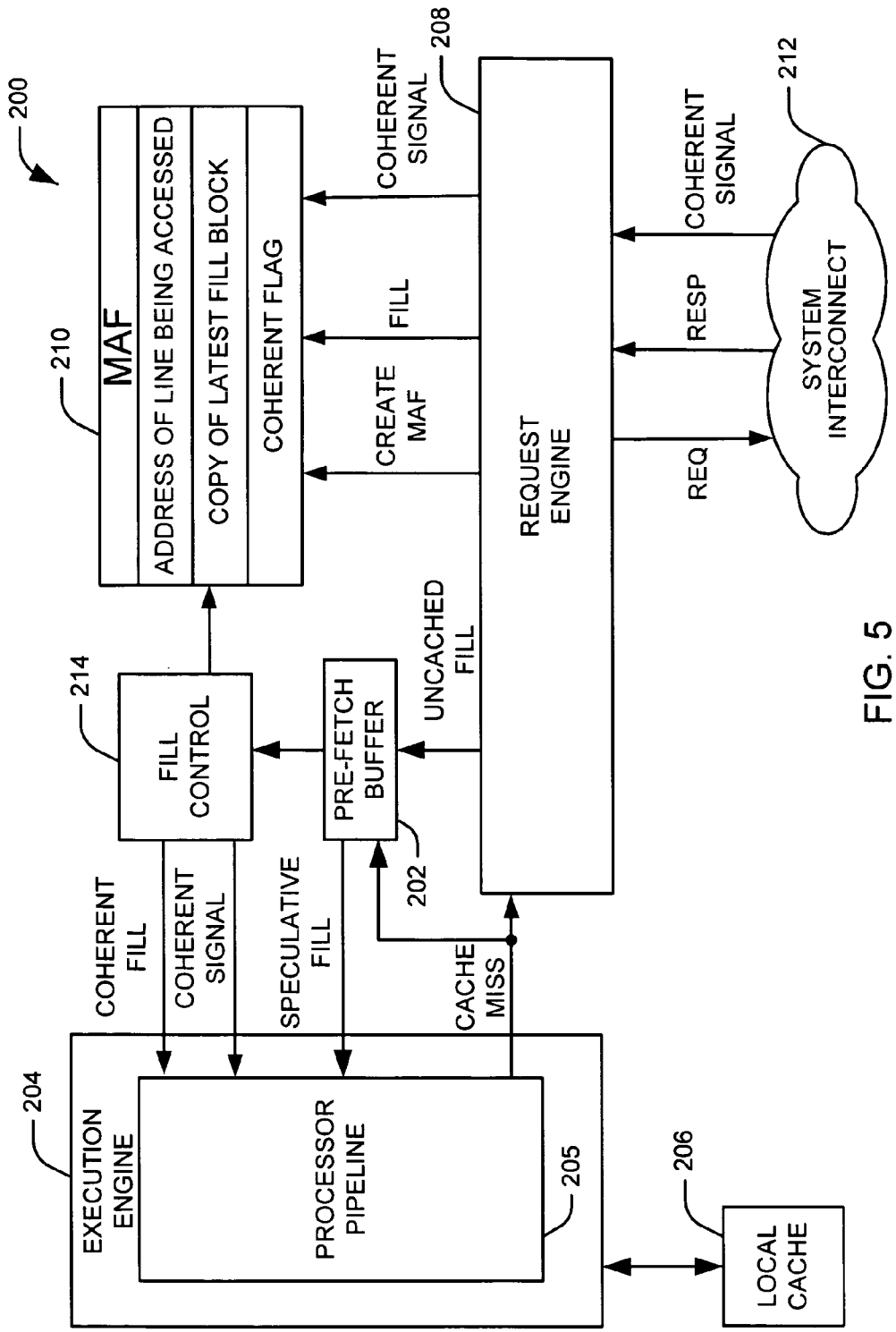
FIG. 5 depicts an example of a processor system.

FIG. 5 illustrates a processor system 200 that employs a pre-fetch buffer 202. The system 200 includes an execution engine 204 that is executing instructions associated with a processor pipeline 205. During a load or store instruction, the execution engine 204 searches a local cache 206 to determine if a desired cache line resides in the local cache 206. If the cache line does not reside in the local cache 206, the execution engine 204 initiates a cache miss to the pre-fetch buffer 202 and a request engine 208. In response to the cache miss, the pre-fetch buffer is searched for a copy of the desired cache line. If a copy is available, it is provided directly to the request engine 208 as a speculative data fill. If no copy is available in the pre-fetch buffer 202, the request engine 208 can retrieve one or more cache lines related to the desired cache line as uncached fills and store them in the pre-fetch buffer for later use by the processor.

The speculative fill is stored in a copy of the latest fill block field in the MAF entry 210 by the request engine 208. A fill control component 214 retrieves a copy of the speculative fill from the MAF entry 210 and provides the speculative fill to the processor pipeline 205. The processor pipeline 205 employs the speculative fill to continue execution of program instructions. The request engine 208 creates a MAF entry 210 in response to the cache miss. The MAF entry 210 can be implemented as a table, an array, a linked list or other data structure programmed to manage and track requests for each cache line. The MAF entry 210 includes fields that identify, for example, the address of the data being requested, the type of request, and response information received from other nodes in response to the request. The request engine 208 thus employs the MAF entry 210 to manage requests issued by the request engine 208 as well as responses to such requests.

The request engine 208 sends a system source request through a system interconnect 212 to obtain a coherent copy of the cache line. In response to the system source request, the system can provide a number of additional data fills to the request engine. As new fills are received from the system, the request engine 208 continues storing the new fills in the copy of latest fill block field of the MAF entry 210 overwriting the previous fills. These subsequent data fills can be ignored. Alternatively, if the subsequent data fill is different from the speculative fill used by the source processor to continue execution, the processor can backup and re-execute program instructions. This may be the case if it is determined that a subsequent fill is more likely coherent than the original fill employed by the processor to continue execution.

The fill control component 214 monitors a coherent flag field in the MAF entry 210 to determine if the coherent flag has changed state, which is an indication that the coherent signal has been received. Once the coherent signal is received from the system, the request engine 208 changes the state of the coherent flag field in the MAF entry 210.

The fill control 214 detects the change in the state of the coherent fill and retrieves a copy of the latest fill block, which corresponds to the coherent version of the data fill. The fill control 214 then compares the speculative fill provided by the fill control 214 to the processor pipeline 205 with the coherent fill. If the coherent data fill is different from the speculative fill, the fill control 214 provides the coherent fill to the processor pipeline 205. The processor pipeline 205 can back up and start executing program instructions again with the new coherent data. If the coherent data fill is the same as the speculative fill, the fill control 214 provides the coherent signal to the processor pipeline 205 indicating that the processor pipeline 205 has already been provided with the coherent data. The processor pipeline 205 can continue execution, until another load or store instruction is encountered.

Figure 6:
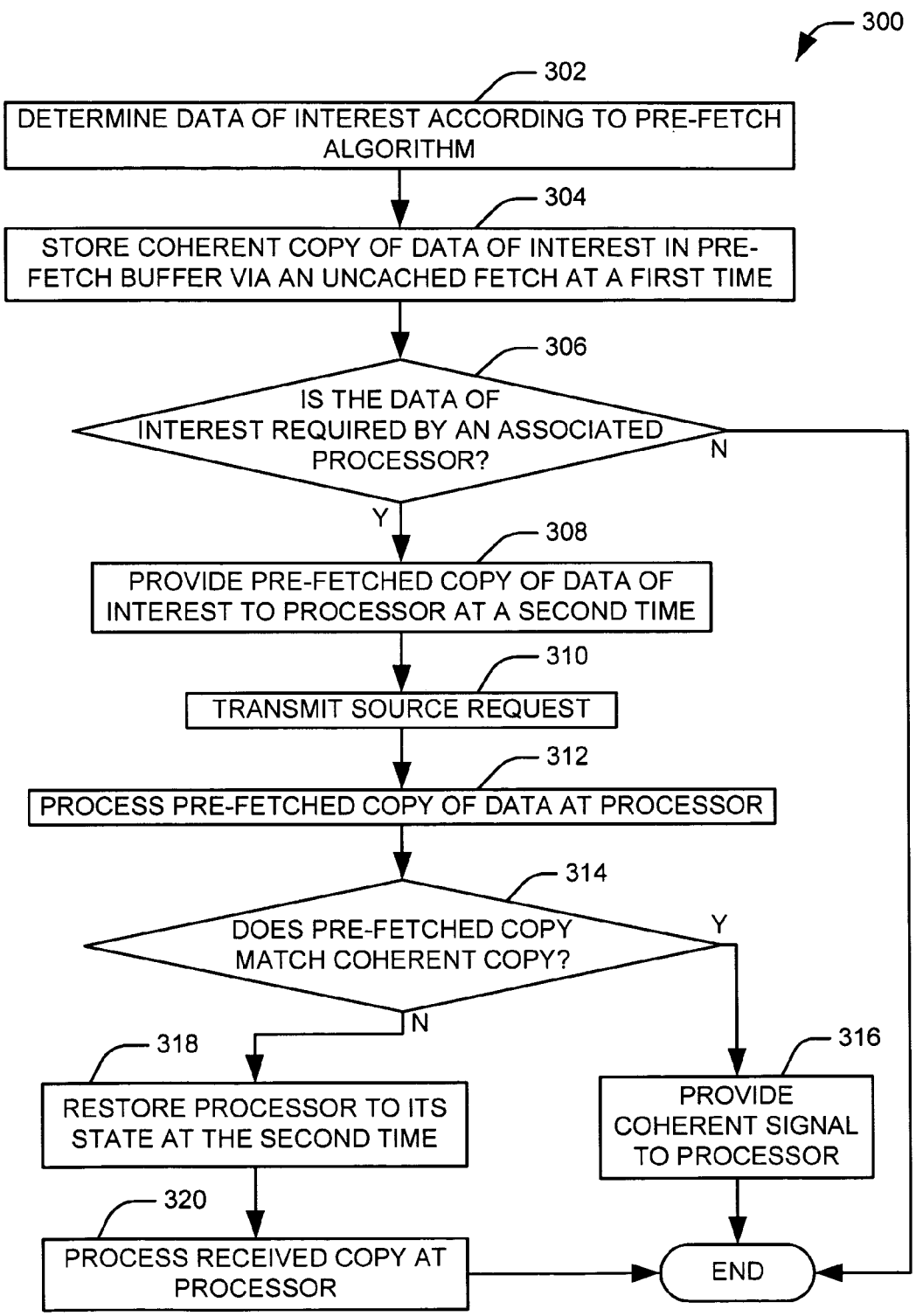
FIG. 6 depicts a flow diagram illustrating a method associated with a source request.
Figure 7:
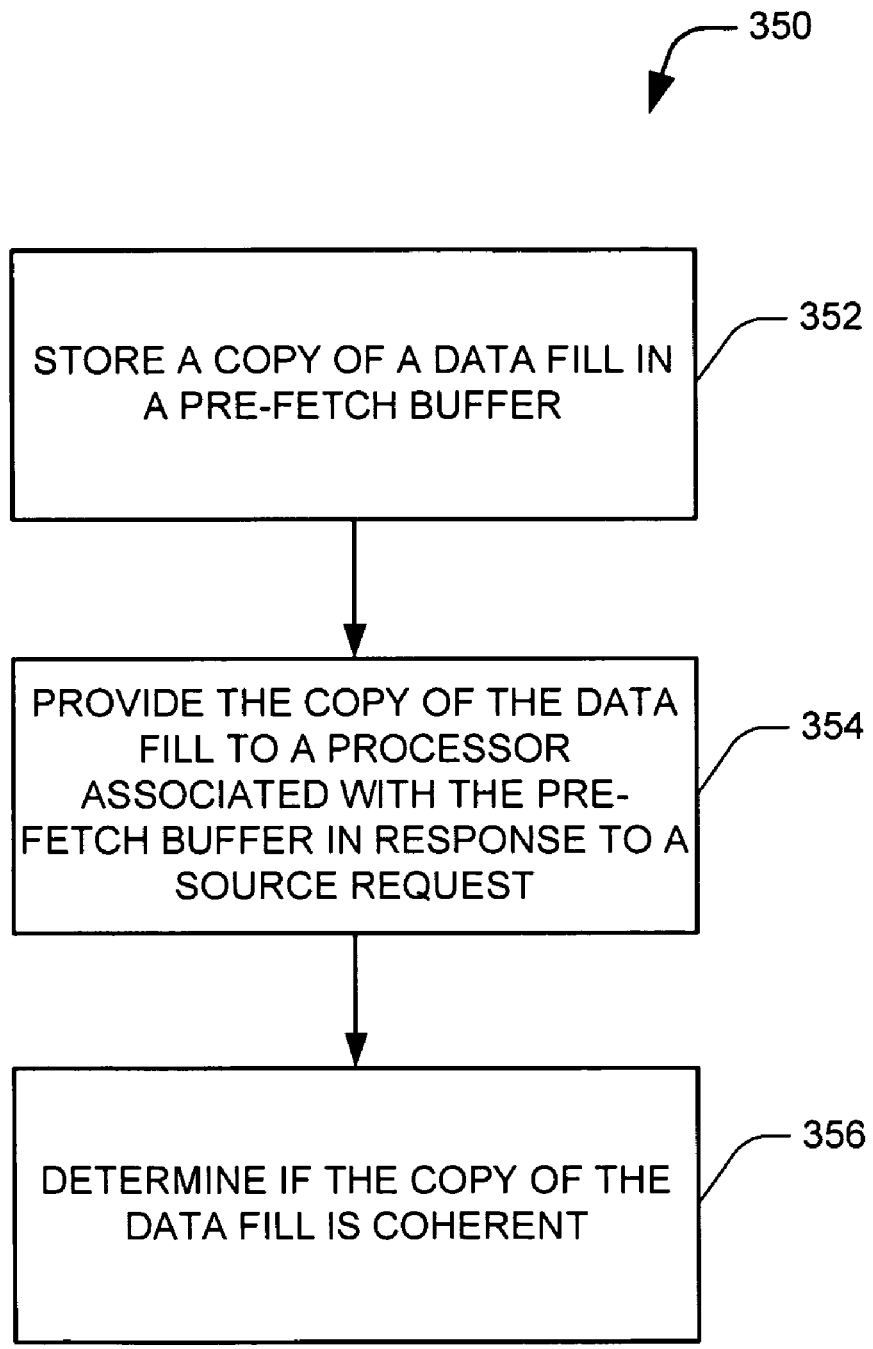
FIG. 7 depicts a flow diagram illustrating another method associated with a source request.

In view of the foregoing structural and functional features described above, certain methods will be better appreciated with reference to FIGS. 6 and 7. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 6 depicts a method 300 for obtaining data in a pre-fetch buffer and providing the pre-fetched data as a speculative fill for an associated processor. At 302, a pre-fetch algorithm determines data of potential interest to the processor according to the present activity of the processor. For example, the pre-fetch algorithm can determine the address of the data block presently being processed by the processor and locate data blocks that are spatially proximate in memory or subsequent in a known pattern of access to the current block.

At 304, a coherent copy of the data of interest is retrieved from an associated owner node as an uncached fill at a first point in time. In an uncached fill, the state of the data or cache line is not changed. Thus, the data can be altered by other processors in the multiprocessor system while the uncached copy is held at the pre-fetch buffer. At 306, the pre-fetch buffer holds the retrieved copy until it is overwritten or retrieved by its associated processor. If the processor does not retrieve the data, the data is overwritten and the method ends. If the processor does require the data, the method advances to 308, where the pre-fetched copy of the data of interest is provided to the processor. The processor can be provided with the pre-fetched copy at a second point in time, some time after the first time.

At 310, the processor begins executing the pre-fetched copy of the data. At 312, the process transmits a source request to the system for a coherent copy of the data. The coherent copy will be provided through the normal cache coherency protocol of the system. Accordingly, the state of the data or cache line can be changed based on the source request type (e.g., read or write) and the cache coherency protocol that is employed.

At 314, it is determined if the coherent copy of the data matches the pre-fetched copy. If the copies match (Y), a coherent signal is sent to the processor at 316. The coherent signal indicates to the processor that the executed pre-fetched copy of the data is a coherent copy, and the processor continues processing the pre-fetched data. The method then ends. If the copies do not match (N), the method proceeds to 318, where the processor is restored to its state at the time at which the processor began processing the pre-fetched copy. This can be accomplished via one or more structures (e.g., memory cache structures) for recording the state of the processor registers at the time of the fill and the changes to the associated cache. At 320, the processor is provided with a coherent copy of the data for processing. A coherent signal can be sent to the processor to indicate that the copy is a coherent copy. The method then ends.

FIG. 7 depicts a method 350 for providing pre-fetched data to a processor. At 352, a copy of a data fill is stored in a pre-fetch buffer. At 354, the copied data fill is provided to a processor associated with the pre-fetch buffer in response to a source request. At 356, it is determined if the copied data fill is coherent.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-processor system that conforms to a cache coherency protocol, the system comprising:
    a pre-fetch buffer that retrieves data from at least one of a main memory of the multi-processor system and a cache associated with a processor of the multi-processor system as an uncached fill, such that the cache coherency state of the data remains unaltered; and
    a source processor that processes the data from the pre-fetch buffer in response to a source request, the source processor processes the data as a speculative data fill until a coherent signal is received, the coherent signal indicating whether the speculative data fill is coherent, wherein the speculative fill is a copy of the data that has an undetermined coherency state, and the source processor continues to execute program instructions with the speculative data fill,
        the source processor having a request engine that sends the source request to obtain at least one data fill from the multi-processor system, the request engine generating a miss address file (MAF) entry associated with the source request, the MAF entry having a field for storing the at least one data fill and a coherent flag that indicates if the coherent signal has been received by the source processor.

2. The system of claim 1, the at least one data fill comprising a coherent data fill, and the source processor returning to a previous state and processing the coherent data fill if it is indicated that the speculative data fill is not a coherent copy of the data.

3. The system of claim 2, further comprising a fill control component that compares the coherent data fill with the speculative data fill, the fill control component providing the coherent data fill to the source processor if the speculative data fill is the same as coherent data fill and providing the coherent signal to the source processor if the speculative data fill is not the same as the coherent data fill.

4. The system of claim 1, the coherent signal indicating a coherent data fill from the at least one data fill.

5. The system of claim 1, the request engine storing a latest data fill received by the source processor in the MAF entry field for storing at least one data fill and changing the state of the coherent flag in response to receipt of the coherent signal by the source processor.

* * * * *